US012636995B2

(12) United States Patent
Vroom

(10) Patent No.: US 12,636,995 B2
(45) Date of Patent: May 26, 2026

(54) MONOLITHIC SINGLE-PIECE SHAFT-AND-PINION HOUSING FOR A SLIDING SUPPORT MECHANISM

(71) Applicant: David H. Vroom, Tucson, AZ (US)

(72) Inventor: David H. Vroom, Tucson, AZ (US)

(73) Assignee: VROOM SLIDE SYSTEMS, LLC, Tucson, AZ (US)

( * ) Notice: Subject to any disclaimer, the term of this patent is extended or adjusted under 35 U.S.C. 154(b) by 0 days.

(21) Appl. No.: 19/029,214

(22) Filed: Jan. 17, 2025

(65) Prior Publication Data

US 2025/0236233 A1 Jul. 24, 2025

Related U.S. Application Data

(63) Continuation-in-part of application No. 29/924,251, filed on Jan. 18, 2024, now Pat. No. Des. 1,082,647, and a continuation-in-part of application No. 29/924,257, filed on Jan. 18, 2024, now Pat. No. Des. 1,084,957, and a continuation-in-part of application No. 29/924,260, filed on Jan. 18, 2024, now Pat. No. Des. 1,063,989.

(60) Provisional application No. 63/675,823, filed on Jul. 26, 2024, provisional application No. 63/622,243, filed on Jan. 18, 2024.

(51) Int. Cl.
*F16H 19/04* (2006.01)
*B60P 3/34* (2006.01)

(52) U.S. Cl.
CPC ................ *B60P 3/34* (2013.01); *F16H 19/04* (2013.01)

(58) Field of Classification Search
CPC .................................. B60P 3/34; F16H 19/04
See application file for complete search history.

(56) References Cited

U.S. PATENT DOCUMENTS

| | | |
|---|---|---|
| 2,881,629 A | 4/1959 | Homier |
| D250,814 S | 1/1979 | Dartnall |
| D267,869 S | 2/1983 | Lenz et al. |

(Continued)

FOREIGN PATENT DOCUMENTS

CN 202130705814.6 10/2021

OTHER PUBLICATIONS

AMTECH, Aluminum Gear Case, https://www.amtechinternational.com/project/aluminum-gear-case/, 2024, 6 pages.

(Continued)

*Primary Examiner* — Minnah L Seoh
*Assistant Examiner* — Gregory T Prather
(74) *Attorney, Agent, or Firm* — Quarles & Brady LLP; Yakov S. Sidorin

(57) ABSTRACT

Methodology of simplifying the manufacture of a sliding support mechanism configured to support a slide-out of an RV by devising a shaft-and-pinion housing configured as a single-piece monolithic component that includes a hard exterior of the housing (with the co-axial first and second openings therethrough, which are dimensioned to accommodate the shaft). The housing is structured to have a separation distance between a first portion of the hard exterior carrying the first opening and a second portion of the hard exterior carrying the second opening to be dimensioned to reversibly receive the pinion in a space between the first and second openings.

16 Claims, 14 Drawing Sheets

(56) References Cited

U.S. PATENT DOCUMENTS

| D285,717 S | 9/1986 | Adams et al. |
| D403,722 S | 1/1999 | Zimmer |
| 5,857,372 A | 1/1999 | Sendzimir et al. |
| D417,178 S | 11/1999 | Gallagher |
| D443,238 S | 6/2001 | Carlson |
| D481,403 S | 10/2003 | Yasui et al. |
| D481,745 S | 11/2003 | Yasui et al. |
| D487,101 S | 2/2004 | Taoka |
| D511,484 S | 11/2005 | Dugaev |
| D603,781 S | 11/2009 | Jimenez |
| D613,652 S | 4/2010 | Ebert |
| D632,701 S | 2/2011 | Lundberg et al. |
| D659,639 S | 5/2012 | Saber et al. |
| D678,337 S | 3/2013 | Yamamoto |
| D735,170 S | 7/2015 | Colvin |
| D746,214 S | 12/2015 | Tran et al. |
| D756,934 S | 5/2016 | Chen et al. |
| D769,341 S | 10/2016 | Lee et al. |
| D797,031 S | 9/2017 | Patalak et al. |
| D825,052 S | 8/2018 | Guthrie |
| D845,350 S | 4/2019 | Gillespie et al. |
| D847,889 S | 5/2019 | Gerber et al. |
| 10,794,464 B2 | 10/2020 | Schmidt et al. |
| D902,811 S | 11/2020 | Veloso |
| D911,248 S | 2/2021 | Lin |
| 11,137,054 B2 | 10/2021 | Vroom |
| D938,496 S | 12/2021 | Kamble et al. |
| D960,070 S | 8/2022 | Yang |
| D1,000,335 S | 10/2023 | Anis |
| D1,029,715 S | 6/2024 | Dennis et al. |
| D1,034,356 S | 7/2024 | Bowden et al. |
| D1,040,713 S | 9/2024 | Thomas |
| D1,052,491 S | 11/2024 | Veloso |
| 12,146,565 B2 | 11/2024 | Wu |
| D1,063,989 S | 2/2025 | Vroom |
| 2008/0124014 A1 | 5/2008 | Smook et al. |
| 2011/0277589 A1 | 11/2011 | Leibold et al. |
| 2017/0320514 A1* | 11/2017 | Sakamoto .............. B62D 3/126 |
| 2018/0372210 A1 | 12/2018 | Poster |
| 2020/0011409 A1 | 1/2020 | Ramirez Ortiz et al. |
| 2020/0189317 A1* | 6/2020 | Marshall ................. F16H 19/04 |
| 2020/0332878 A1 | 10/2020 | Hafermalz et al. |
| 2021/0270351 A1* | 9/2021 | Vroom ................... F16H 19/04 |
| 2023/0392680 A1 | 12/2023 | Saar et al. |

OTHER PUBLICATIONS

Desighwithajay, How to Design Roller Shaft with Bearing Housing, https://www.youtube.com/watch?v=dUZezPiQIGo, 2021, 1 page.
Dreamstime, Cross Section Show Metal Helical Gear, https://www.dreamstime.com/cross-section-show-metal-helical-gear-cogs-gear-bearing-housing-shaft-detail-inside-transmissions-gearbox-industrial-image252699183, 2024, 4 pages.

* cited by examiner

130

136

134

132

132

From 102

120,
130

134'

146'

142

104

140

148

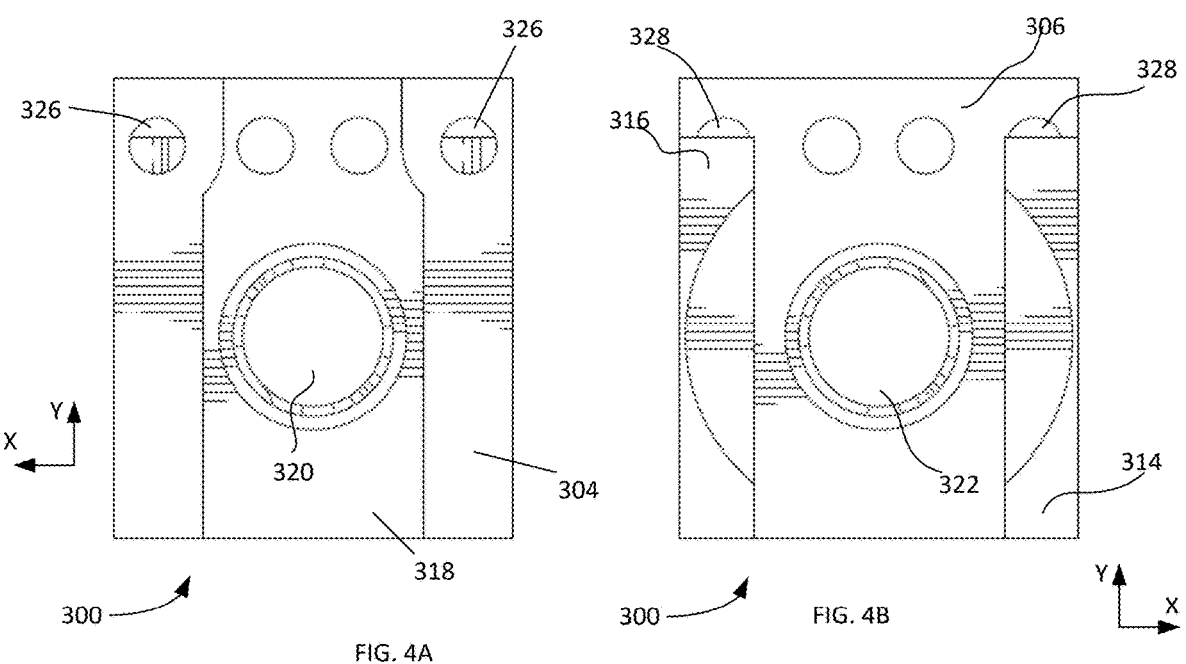
FIG. 4A
FIG. 4B
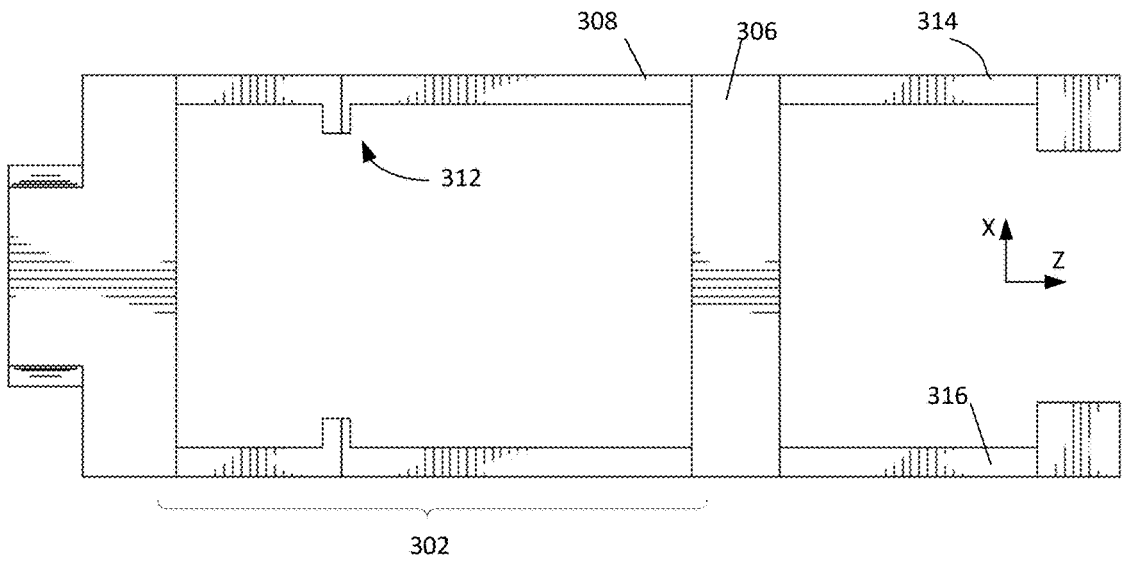
FIG. 5

FIG. 10A                    FIG. 10B

MONOLITHIC SINGLE-PIECE SHAFT-AND-PINION HOUSING FOR A SLIDING SUPPORT MECHANISM

CROSS REFERENCE TO RELATED APPLICATIONS

This US Patent Application technically claims priority from the U.S. Provisional Patent Application No. 63/622,243 filed on Jan. 18, 2024; U.S. Design Pat. Application No. 29/924,251 filed on Jan. 18, 2024, 29/924,257 filed on Jan. 18, 2024, and 29/924,260 filed on Jan. 18, 2024. This US Patent Application also claims priority from the U.S. Provisional Patent Application No. 63/675,823 filed on Jul. 26, 2024. The disclosure of each of the above-identified patent documents is incorporated by reference herein.

TECHNICAL FIELD

The present invention relates to slide-out modules (or, simply, slide-outs) commonly used in a recreational vehicle or a motor home and, more particularly, to motorized sliding support mechanisms employable to support such slide-out modules.

RELATED ART

Rack-and-pinion sliding support mechanisms and mechanical elements of such mechanisms have been discussed in related art—for example, in the U.S. Pat. No. 11,137,054, the entire disclosure of which is incorporated by reference herein. In a typical rack-and-pinion sliding support mechanism, one or more shafts are coupled to pinions configured to engage with one or more racks and are driven by one or more motors. The rack and pinion are structured to provide vertical and horizontal displacement to reduce premature component wear leading to poor gear mesh caused to by forces on the mechanism during use. A motor assembly is specifically designed to at least reduce the influence of torques generated by the motor and transferred to the pinions and to reduce motor failures.

In a conventional sliding support mechanism, a pinion (with a portion of the shaft on which such pinion is secured) is protected by and at least partially enclosed in a shaft-and-pinion housing that is necessarily assembled from multiple elements connected to one another, which reduces the strength of the overall assembly that is—as is well known—is subjected to high torques during repeated operation.

SUMMARY OF THE INVENTION

Embodiments of the invention provide an article of manufacture that includes at least a portion of a general rack-and-pinion sliding support mechanism configured for use with a slide-out of an RV—in particular, the portion that includes a shaft-and-pinion housing that is configured as a single-piece monolithic component or profile of a chosen material (and that is configured as a part of such sliding support mechanism containing a shaft with a pinion secured on the shaft). The housing includes at least a hard exterior (that is, a layer of material having an outer surface and an inner surface separated from the outer surface by the thickness of the layer; with a first opening therethrough and a second opening therethrough, where the first and second opening are co-axial and share an opening axis and are dimensioned to accommodate the shaft therethrough). Here, a first separation distance between a first portion of the hard exterior that carries the first through-opening and a second portion of the hard exterior that carried the second through-opening is dimensioned to reversibly receive the pinion in a space between theses first and second openings. An embodiment of the article additionally includes a first retaining element protruding from the first portion of the hard exterior and a second retaining element protruding from the second portion of the hard exterior. (Here, at least one of said first and second retaining elements is configured to fit dimensionally into a receiving rack of the sliding support mechanism such as to limit repositioning of the housing along the opening axis and along a first axis that is transverse (in one example—perpendicular) to the opening axis. Optionally, at least one of the following structural conditions is satisfied: (a) at least one of the first and second retaining elements is monolithic with the housing or includes an element removably attachable to the corresponding portion of the hard exterior, and (b) when such at least one of the first and second retaining elements includes an element removably attachable to the corresponding portion of the hard exterior, such removable element includes a roller and/or a piece of material configured to be attachable to the housing. Notably, the single-piece monolithic component of profile may be implemented to include a component in which a space between the first and second portions of the hard exterior is not limited along a second axis that is transverse to both the first axis and the opening axis; or to include a hollow structural section (that contains a substantially polygonal hollow having an axis of the hollow and limited by a first wall, a second wall opposite to the first wall, a third wall and a fourth wall opposite to the third wall). In the latter case, the first wall, the second wall, the third wall, and the fourth wall are configured as parts of the hard exterior, and the axis of the hollow is parallel to the first axis. In either of these two cases, the single-piece monolithic component or profile is structured to include at least one inner wall rib or step (on an inner surface of such monolithic profile) that extends along the first axis or along a second axis that is transverse to both the first axis and the opening axis. Optionally—when the single-piece monolithic profile includes the substantially polygonal hollow (in one non-limiting case—a substantially rectangular hollow), the article includes a pair of inner wall ribs extending along the axis of the hollow on inner surfaces of the third and fourth walls, respectively, and protruding towards each other from respective walls. At least one of the first and second openings may be internally threaded Substantially every implementation of the article of manufacture may include the shaft inserted through the first and second openings to traverse the housing in a direction substantially parallel to the opening axis, as well as the pinion removably put on and secured on the shaft between the first and second portions of the hard exterior such as to have longitudinal movement of the shaft and/or pinion along said opening axis limited by at least one inner wall rib formed on an inner surface of the housing. Alternatively or in addition substantially every implementation of the article of manufacture may include a motor removably secured to the shaft. Furthermore, at least one embodiment of the article may be structured to include the rack assembly of the sliding support mechanism (which assembly includes a rack) and to satisfy at least one of the following conditions: (i) the rack assembly has a first upper sliding surface and a first lower sliding surface, the first lower sliding surface defining a first channel having a height of the first channel and a width of the first channel; and (ii) the first and second retaining elements include a first wear surface configured to laterally slide upon the first upper sliding surface and a second wear surface configured to slide within the first channel. When at least one of these conditions is satisfied, the housing may be dimensioned to have a first separation between the first and second wear surfaces along the opening axis and a second separation between the opening axis and the rack to limit a displacement of a combination of the housing and the pinion to maintain operable engagement between the pinion and the rack both along the opening axis and along the first axis.

Embodiments additionally provide a method for producing substantially every implementation of the article of manufacture alluded to above and/or discussed in the disclosure a process that includes at least a step of molding (such as, in a non-limiting case, extrusion molding). An implementation of the method may further include a step of machining a material of the housing following the step of molding.

BRIEF DESCRIPTION OF THE DRAWINGS

The invention will be more fully understood by referring to the following Detailed Description of Specific Embodiments in conjunction with the Drawings, of which:

FIGS. 4A, 4B, and 5 present the embodiment of FIGS. 3A, 3B in a font view, a back view, and a top view, respectively.

FIGS. 10A, 10B, and 10C present the embodiment of FIGS. 9A, 9B in a font view, a back view, and a top view, respectively.

Generally, like elements or components in different Drawings may be referenced by like numerals or labels and/or the sizes and relative scales of elements in Drawings may be set to be different from actual ones to appropriately facilitate simplicity, clarity, and understanding of the Drawings. For the same reason, not all elements present in one Drawing may necessarily be shown or indicted in another.

DETAILED DESCRIPTION

Conventional solutions to mechanical cooperation between the sliding mechanism and a wall of the RV that supports the slide-out are well recognized to exhibit, in operation of the sliding mechanism, structural weaknesses almost inevitably resulting is eventual destruction of such mechanical cooperation.

One of such weaknesses could be traced to the multi-piece nature of the construction of the particular housing unit structured as an enclosure for the pinion-on-the-shaft portion of the rack-and-pinion based sliding mechanism. (In the prior art documents referred to herein and in this disclosure such housing may be referred to as a shaft-and-pinion housing, for example). As will be understood by a skilled person from the technical discussion presented below in reference to FIGS. 1A, 1B, 1C, 1D, the need in forming such shaft-and-pinion housing unit from several (as discussed—two, but sometimes three) constituent housing union components is caused by practical difficulty (if not the impossibility) of forming specific elements of such housing unit while structuring such housing unit in a monolithic fashion. Specifically—as discussed, for example, in the U.S. Pat. No. 11,137,054—the practically useful shaft-and-pinion housing includes judiciously dimensioned "overhang" elements and/or wear surfaces that are necessary to spatially stabilize the operation of the rack-and-pinion mechanism and the structure of which substantially prevents the formation of a monolithic shaft-and-pinion housing unit while maintaining cost-efficient mass production of the sliding mechanism.

Figure 1A:
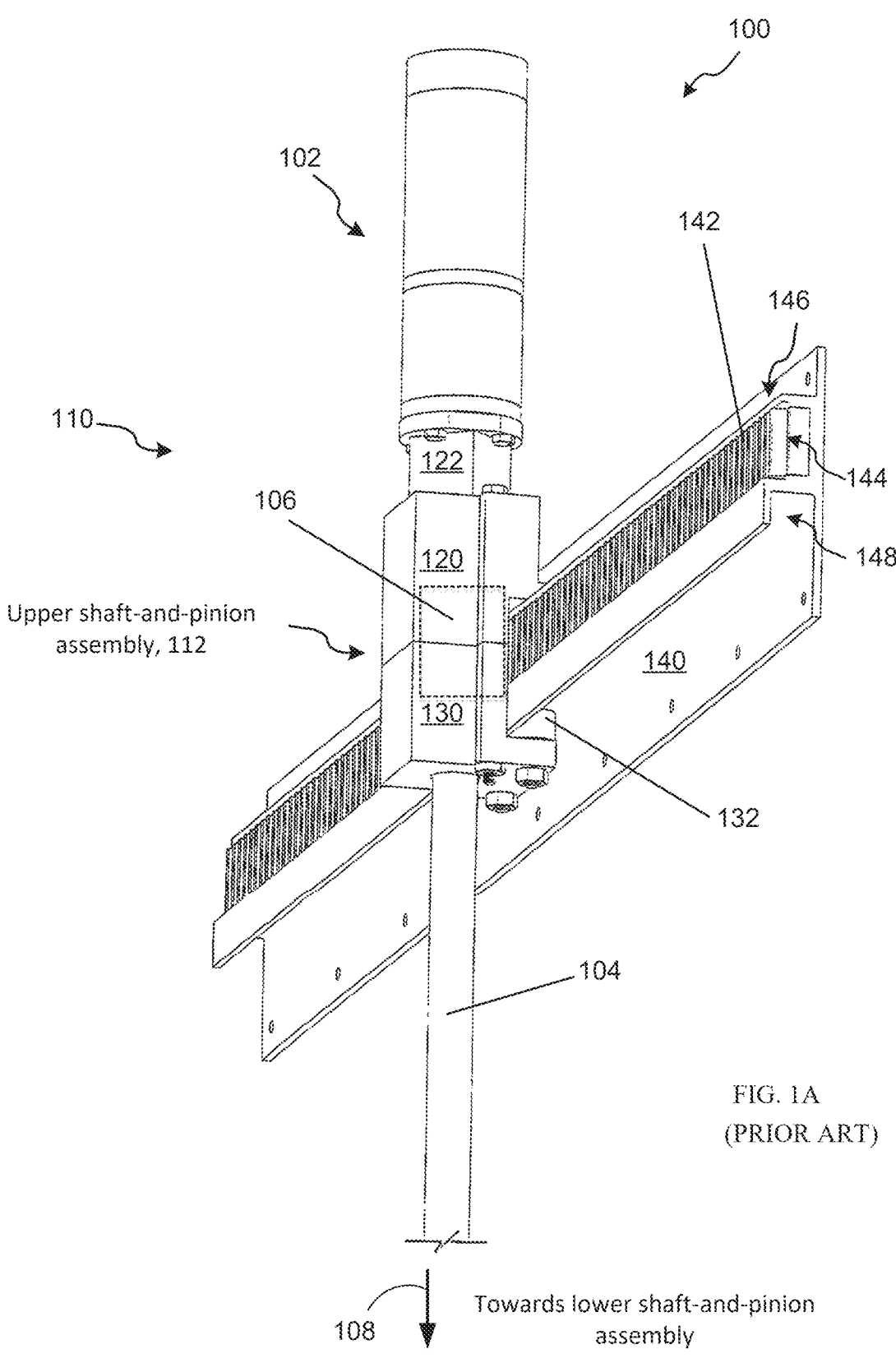
FIG. 1A is a perspective view of an embodiment of the conventionally-configured sliding support mechanism.

To this end, FIGS. 1A, 1B, 1C, and 1D illustrate key features of one non-limiting example of a portion of a conventionally-structured sliding support mechanism 100. What is expressly shown in FIG. 1A is only the upper portion of the mechanism 100, which generally includes a shaft assembly 110 and a rack assembly 140. As shown in this example, the shaft assembly 110 includes a motor gearbox assembly 102 (interchangeably referred to herein as a motor assembly and including a motor of the sliding support mechanism), a shaft 104 (rotated by the motor of the motor assembly when engaged with it), a pinion 106, and a shaft-and-pinion housing unit that is shown to include multiple housing portions that must be assembled together:

an upper shaft-and-pinion housing portion 120, and a lower shaft-and-pinion housing portion 130. (The presence of the lower portion of the mechanism, which substantially duplicates the operationally-cooperated rack-and-pinion sub-systems, is indicated with the arrow 108. Unlike the upper portion of the sliding mechanism expressly illustrated in FIG. 1A, the lower portion of the mechanism typically does not include a motor assembly 102: the motor assembly is disposed only at one end of the shaft 104.)

Figure 1B:
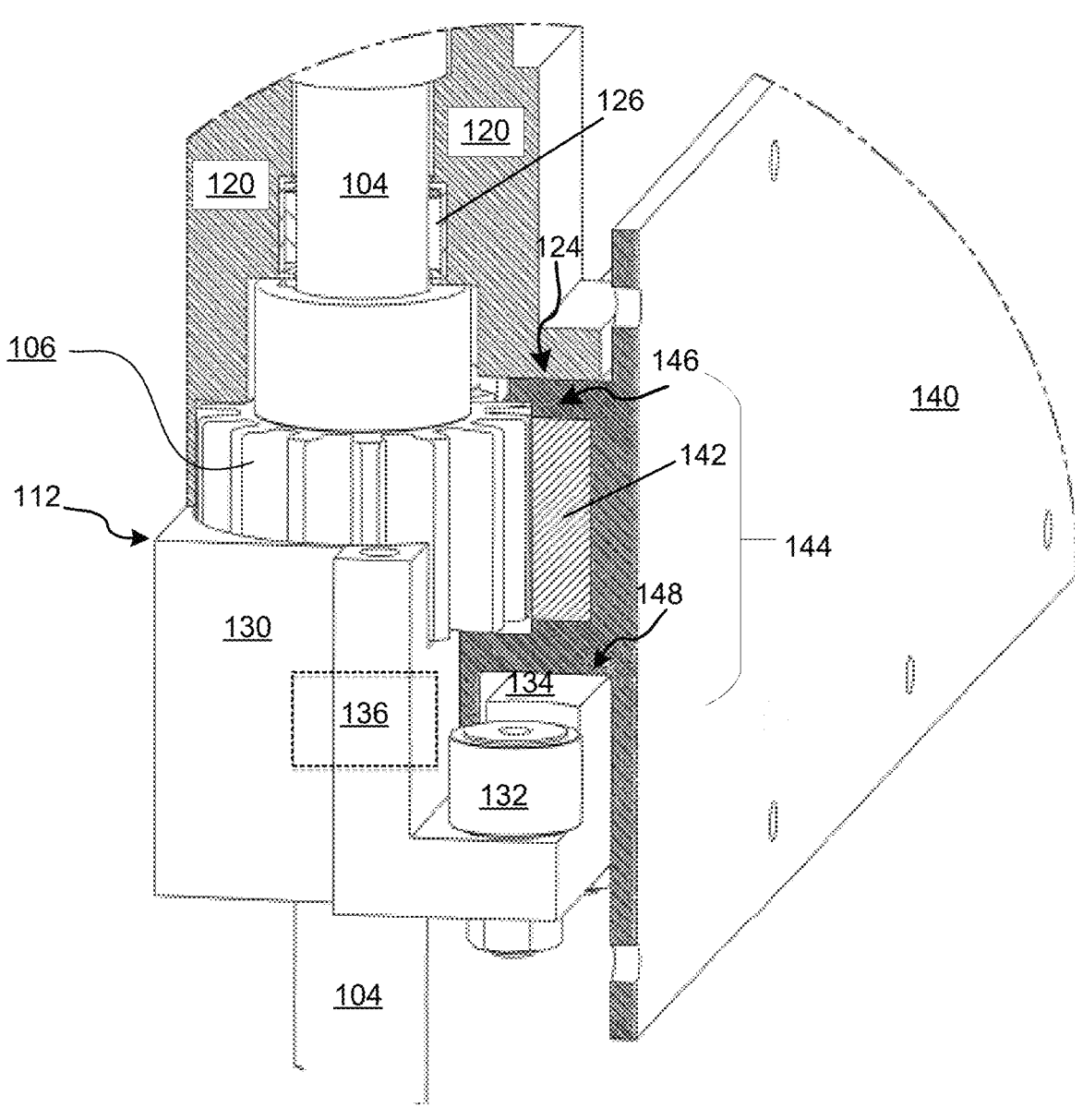
FIG. 1B is a cross-sectional perspective view showing further details of the mechanism of FIG. 1A.
Figures 1C, 1D:
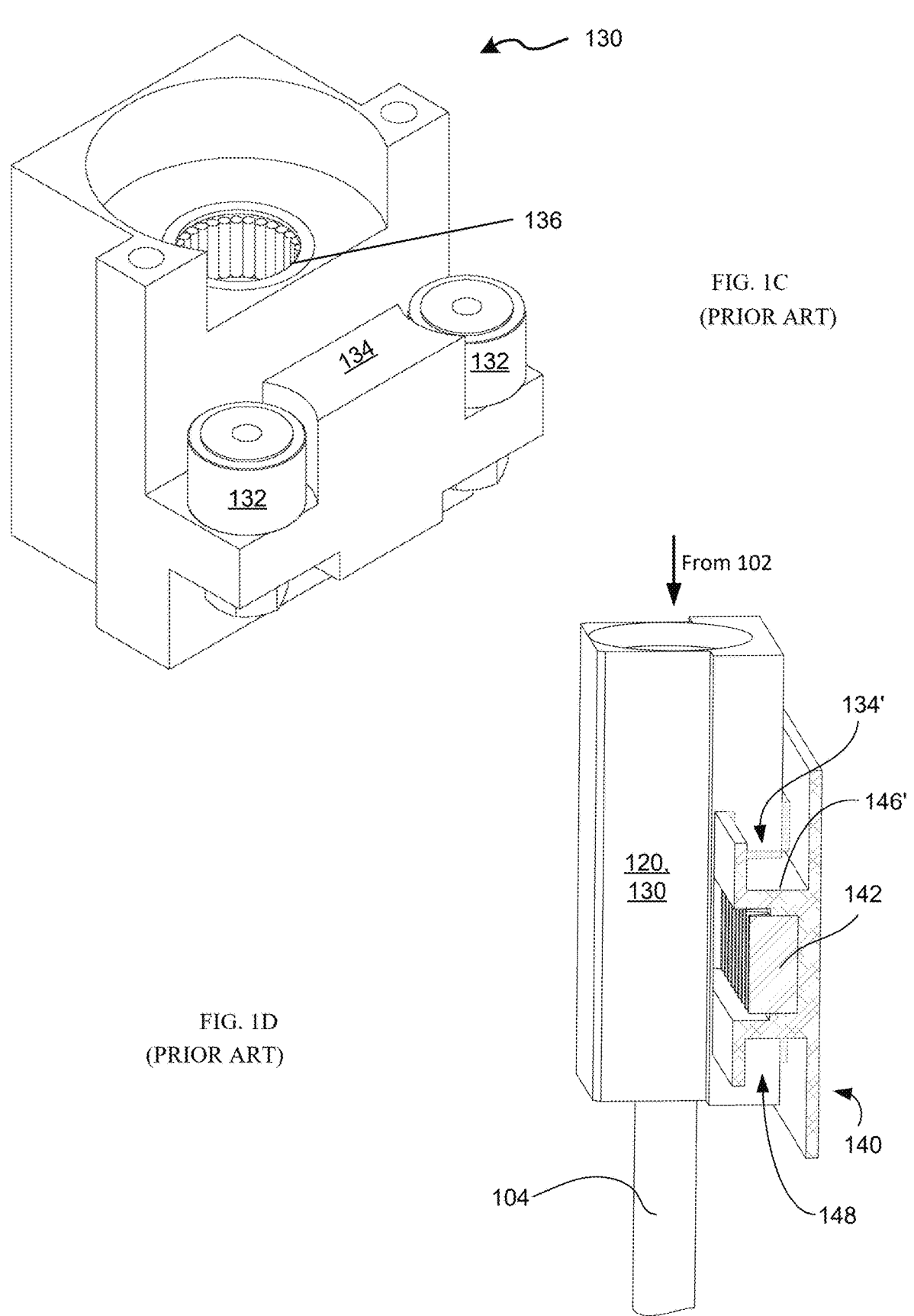
FIG. 1C is a detailed perspective view of selected elements shown in FIGS. 1A and 1B.
FIG. 1D is a schematic illustration of a portion of an embodiment in which the rack assembly forms U-shaped channels at locations both above and below the rack gear to accommodate at least one of a combination of multiple rollers and a wear surface of the upper and lower shaft housings, respectively.

FIG. 1B is a hybrid cross-sectional perspective view of a portion of the mechanism 100 with cutaways, illustrating certain features of the embodiment of FIG. 1A in greater detail. FIG. 1C provides a simplified illustration of a portion of the lower shaft housing, and FIG. 1D addresses the specific form of coupling between a shaft housing multi-element unit (120, 130) and the rack assembly.

Figures 2A, 2B, 2C, 2D:
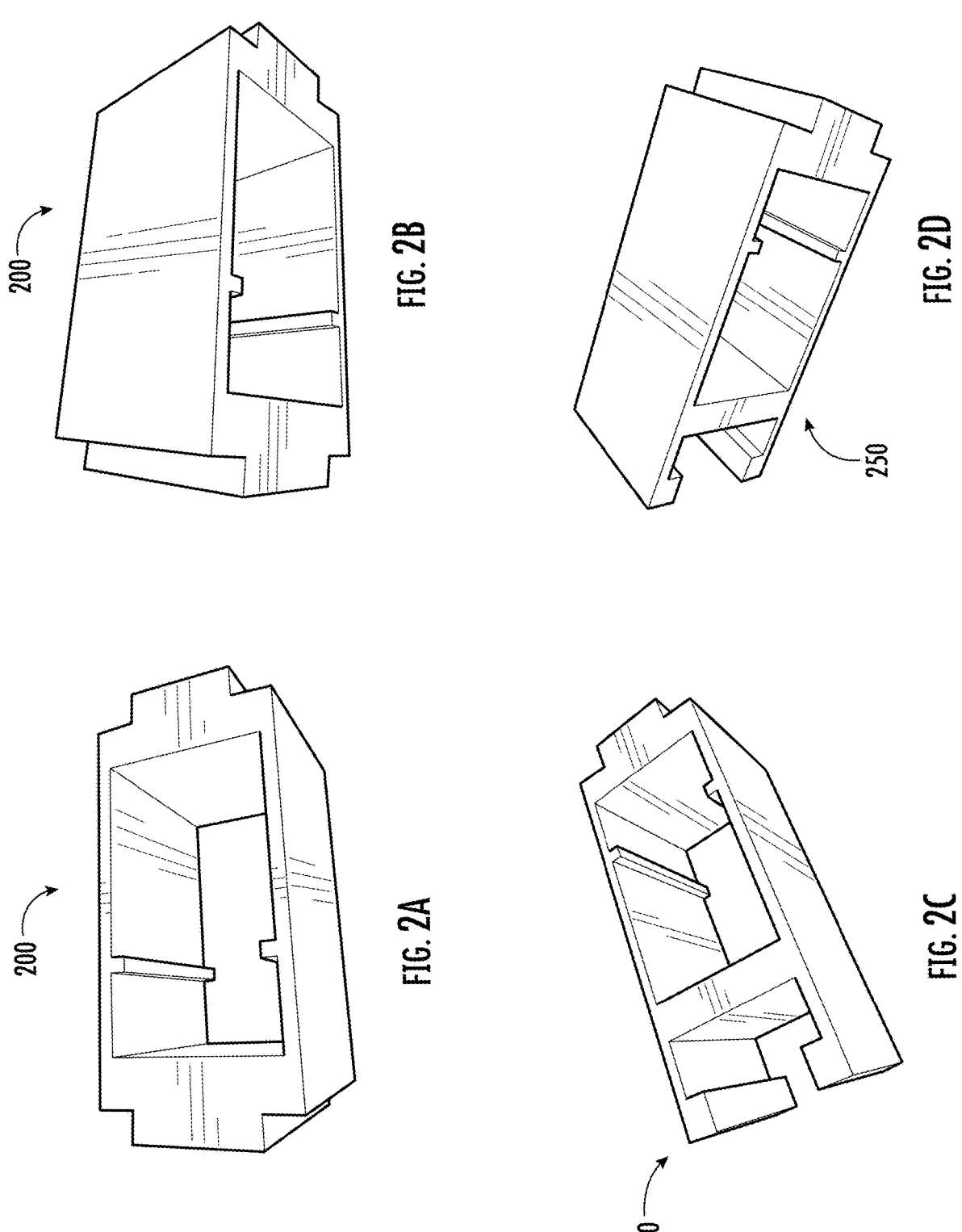
FIGS. 2A and 2B, and FIGS. 2C and 2D schematically illustrate, respectively, two different pre-forms prepared with the use of a molding process—in one case, the extrusion—from which various embodiments of the single-piece monolithic shaft-and-pinion housing, structured according to the idea of the present invention, is then generated with the use of, for example, simple machining processes.

In one specific case, the motor assembly 102 is operationally attached to the upper shaft housing 120 with a motor coupling 122 (seen in and discussed in reference to FIG. 2 of U.S. Pat. No. 11,137,054), inside which the rotor of the motor assembly is coupled to the end of the shaft 104. The shaft assembly 110 includes at least one pinion 106 (shown in detail in FIG. 1B), which is dimensioned to couple to the shaft 104 and to engage the rack assembly 140. For convenience, the upper shaft-and-pinion housing portion 120 and the lower shaft-and-pinion housing portion 130, taken together with the components they embrace or house or include, may be referred to as (an upper) shaft-and-pinion assembly 112. It is understood, therefore, that the shaft assembly 110 at the upper end of the shaft generally includes the motor assembly 102, the upper shaft-and-pinion assembly 112 appropriately operationally coupled with the motor assembly 102 (that is, via the motor coupling 122, for example), and the shaft 104 passing therethrough. The shaft assembly 110 is configured to be coupled to a rack 142 of the rack assembly 140. In further reference to FIGS. 1A and 1B, the rack assembly 140 includes the rack 142 and, typically, a recess profile 144 in which the rack 142 is secured. The recess may have a top surface 146, which forms a roof of the recess 144 and may include a floor structure 148, which forms or is dimensioned as an inverted U-shaped channel.

The need to have the overall shaft-and-pinion housing unit be assembled—again and again—from shaft-and-pinion housing portions 120, 130 that are separable and separate from one another is explained and caused by a technical solution implemented to address the prevention of frequently-occurring misalignment between the pinion and the rack that persists in sliding mechanisms of related art. Such conventional multi-piece solution manifests in that at least one of the upper shaft-and-pinion housing portion 120 and the lower shaft-and-pinion housing portion 130 includes component(s) specifically structured to maintain the nominal and pre-determined spatial orientation between the shaft assembly 110 and the rack assembly 140 regardless of the presence of forces tending to de-couple the rack from the pinion in a plane containing the shaft 104 and/or in a plane transverse to the shaft 104.

Generally, either or both of the upper shaft-and-pinion housing portion 120 and the lower shaft-and-pinion housing portion 130 may include one or more of the corresponding wear surfaces and pairs of rollers (as will be discussed in more details below), each of which is judiciously dimensioned to maintain the nominal orientation of the shaft assembly 110 with respect to the rack assembly 140. The upper and lower shaft-and-pinion housing portions 120, 130 may also include various additional wear surfaces and house or encase at least one bearing (as discussed, for example, in U.S. Pat. No. 11,137,054). Formation of such motion-stabilizing material block/surface requires the use of a machining process the implementation of which makes the production of the overall shaft-and-pinion housing unit (120+130) as a monolithic, single-piece component practically very complicated and cost-wise—substantially prohibitive.

In the example of FIG. 1C, for instance, the lower shaft-and-pinion housing portion 130 is shown to include at least a pair of rollers 132 and/or the wear surface 134 that protrudes between the rollers 132 (one of which is visible in FIGS. 1A and 1B). It is the operational misalignment between the pinion 106 and the rack 142, caused by the "rocking" of the shaft-and-pinion assembly 112 with respect to the rack 142 in a plane substantially transverse (or even perpendicular) to the shaft 104 that the necessary use of at least two rollers 132 is negating (when such at least two rollers 132 are housed in the structure of the recess profile 144 of the rack assembly 140, as discussed below). The skilled person appreciates that rollers 132 are structured as retaining elements that are configured to fit dimensionally in a receiving portion of the rack assembly 140. Indeed, as practice repeatedly showed on multiple occasions, the use of only one, single roller for this purpose is utterly insufficient, as the rack and pinion are still brought out of alignment to the point of being stuck, thereby simply ceasing the operation of the sliding mechanism and requiring a time-consuming repair. To protect the rollers from outside mechanical impact and to even further stabilize the operational coupling between the rack and the pinion against the rocking motion occurring in the plane substantially transverse to the shaft 104, the material block/overhang portion of the (in this example—lower) shaft-and-pinion housing portion 130 with the surface 134 of the material piece (shown positioned between the rollers) is judiciously machined. (The upper shaft-and-pinion housing portion 120, when equipped with the corresponding roller(s), is also complemented with a similar material block/surface.)

Embodiments of the invention overcome this practical problem by devising a single-piece, monolithic embodiment of the housing for a shaft-and-pinion joint of the sliding mechanism that, on the one hand, is substantially devoid of structural elements protecting the elements (such as rollers and/or material protrusions from the housing) that are structured to retain the shaft-and-pinion housing in a corresponding receiving portions of the rack assembly that had to be used in related art and that, on the other hand, is configured to maintain stabilization of the rocking motion during the operation of the sliding mechanism as required by the operation of the overall sliding mechanism 100. The removal of the need in such structural elements facilitates the fabrication of the single-piece monolithic embodiment in a process involving a simple shaping of a molten material, optionally complemented with substantially unsophisticated machining process, thereby drastically increasing the fabrication throughput, and reducing the cost of a single monolithic unit of the shaft-and-pinion housing.

To this end—and with understanding that the exact structure of the embodiment of the proposed single-piece monolithic housing depends on the specifics of a particular design of a sliding support mechanism—two differing from one another approaches to structing such housing are discussed below—the one referred to as having a "hollow structural section" and the other that does not possess such section. As the skilled person will readily appreciate from the discussion below, both of these approaches—presented not as limiting embodiments but as examples only—possess the same structural characteristic in that the resulting monolithic housing structures include a corresponding hard exterior (of the housing structure) that has first and second co-axial openings therethrough dimensioned to accommodate the shaft of the shaft assembly of the sliding support mechanism, and in that a distance between a first portion of the hard exterior carrying the first opening and a second portion of the hard exterior carrying the second opening is dimensioned to reversibly receive (house) the pinion in a space between the first and second openings.

Figure 12:
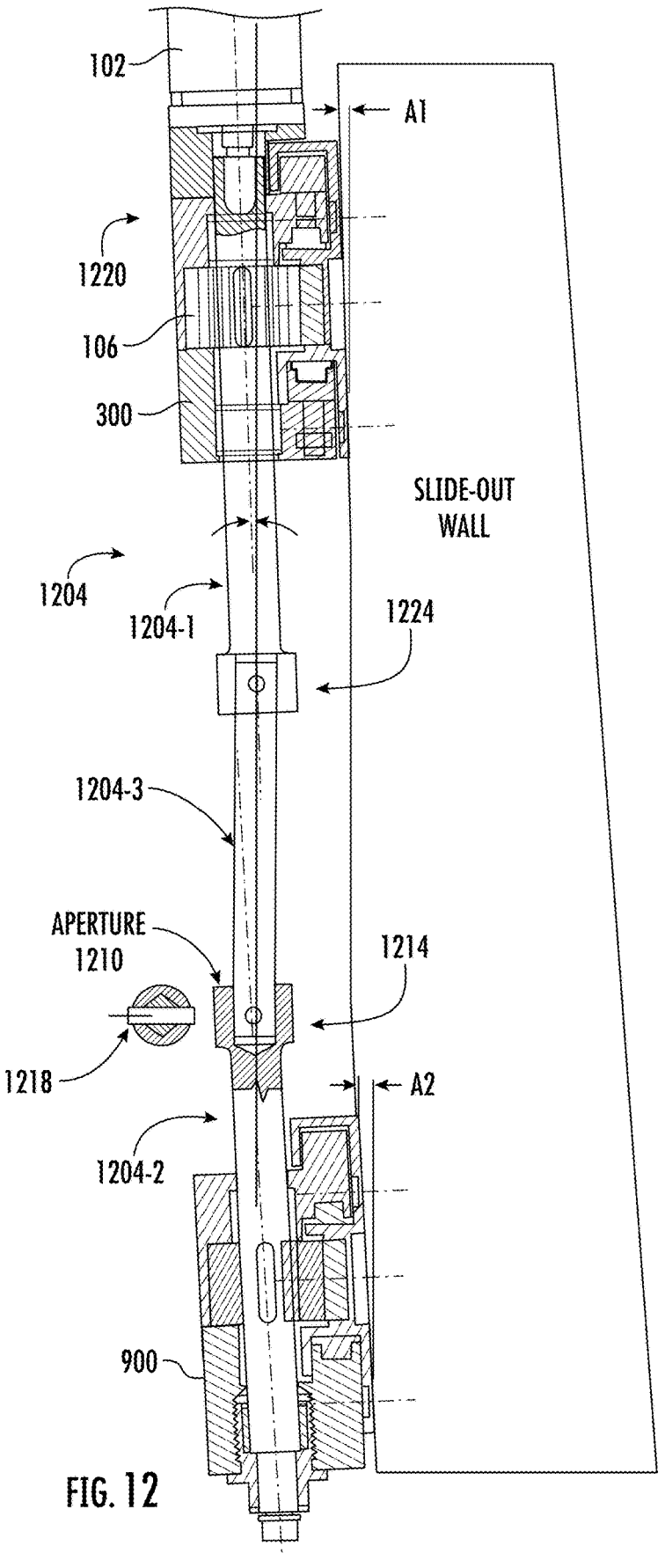
FIG. 12 illustrates a portion of an embodiment of the sliding support mechanism that includes a single-piece monolithic shaft-and-pinion housing and a multi-piece shaft.
Figure 13:
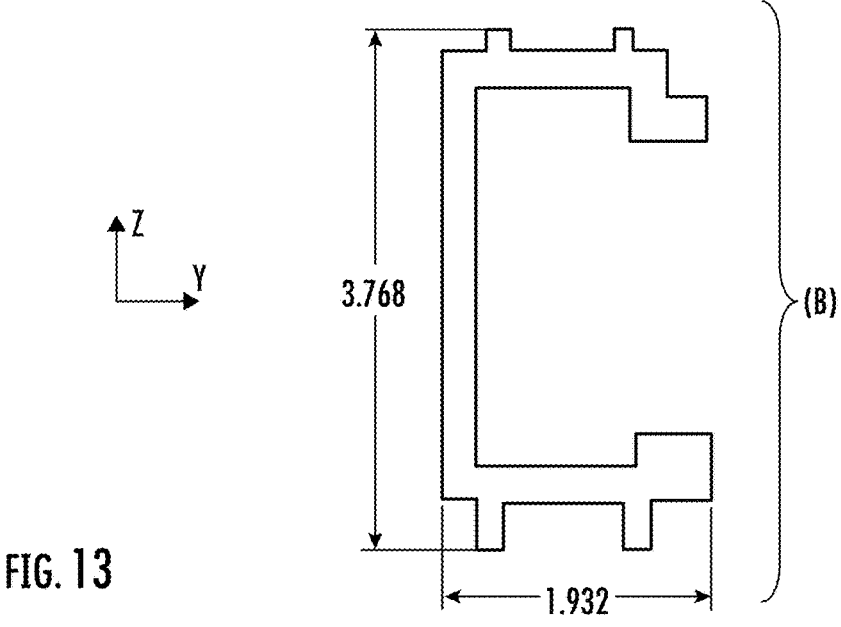
FIG. 13 provides side views of related embodiments of the shaft-and-pinion housings that are structurally different from those of FIGS. 3A, 7A, 9A, and a schematic view of a shaft assembly employing one of these related embodiments, thereby illustrating cooperation of the embodiment of the shaft-and-pinion housing with the shaft and pinion of the assembly.

One of the mentioned approaches to structuring related embodiments of the monolithic housing (and using such embodiments in an assembly incorporating at least some additional components of the overall sliding support mechanism) are discussed in substantial detail in reference to FIGS. 2A through 11, and the other—only cursorily, in reference to FIG. 13. FIG. 12 addresses the use of any of the resulting embodiment in a general sliding support mechanism that includes a multi-piece shaft (for the same of simplicity, however, only the use of the shaft-and-pinion housing possessing the hollow structural section is expressly depicted in FIG. 13).

FIGS. 2A and 2B, and FIGS. 2C and 2D schematically illustrate, respectively, two different pre-forms 200, 250 prepared with the use of a molding process—in one case, the extrusion—from which various embodiments of the single-piece monolithic shaft-and-pinion housing, structured according to the idea of the present invention, are then generated with the use of, for example, simple machining processes.

Figure 3A:
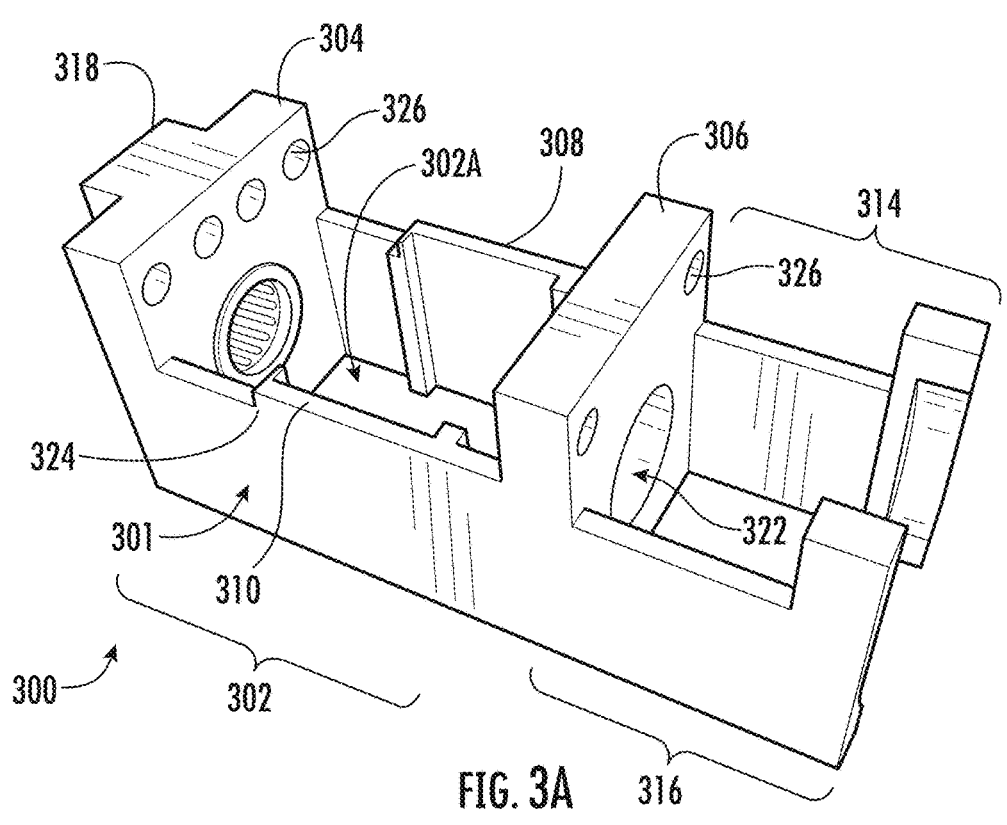
FIGS. 3A, 3B show one specific embodiment of the single-piece monolithic shaft-and-pinion housing in two different perspective views.
Figure 3B:
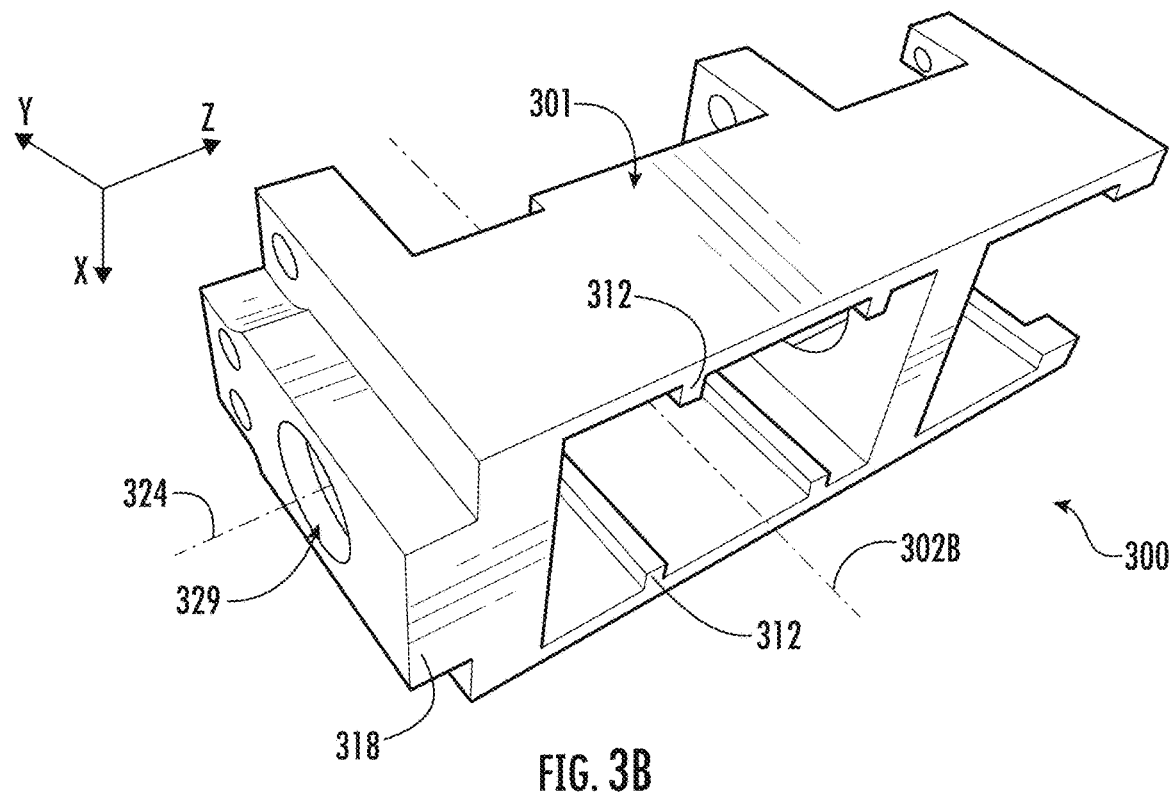

FIGS. 3A, 3B show one specific embodiment 300 of the monolithic shaft-and-pinion housing (dimensioned as a part of a sliding support mechanism containing a shaft) in two different perspective views. As can be seen, the embodiment 300 includes a hard exterior 301 with two openings therethrough (discussed below as 320, 322) that are formed, respectively, in corresponding portions of the hard exterior (discussed below as 304, 306) and are co-axial with one another. (The separation between such portions of the hard exterior is judiciously dimensioned to reversibly receive a pinion 106 of the shaft assembly 110 of the overall sliding mechanism.)

FIGS. 4A, 4B, 5 present the same embodiment 300 in front, back, and top views, respectively. In this example, the embodiment 300 is generated from the extruded preform 250. As shown, the embodiment 300 is configured as a single-piece monolithic profile (preferably—of a metallic material, though other materials of high hardness can be employed, e.g. some specific hard plastics) that includes a hollow structural section (or HSS) 302. The HSS includes a substantially rectangular hollow 302A that has an axis of the hollow 302B and that is limited by walls of the hard exterior, specifically walls 304, 306 that are opposing to one another and by walls 308, 310 that are opposing to one another. The side walls 308, 310 carry respective inner wall ribs or steps 312 forming a pair of inner walls ribs or steps that extend along the axis of the hollow 302B on the inner surfaces of the respective walls and protrude towards each other. (Optionally, an embodiment may include a pair of auxiliary inner wall ribs extending along the axis 302B on inner surfaces of the side walls and protruding towards each other—see, for example, FIG. 10C.)

The HSS 302 may be optionally complemented by wing portions 314, 316 (here shown as present) each of which extends outwardly from the wall 306 along the corresponding of the side walls 308, 310. As the skilled person will readily appreciate, the wing portions are judiciously structured to affix and secure a corresponding motor assembly 102 to the housing 300. (A related embodiment of the shaft-and-pinion housing may be devoid of such wing portions—see, for example, those of FIGS. 7A, 7B or of FIGS. 9A, 9B—in which case the embodiment of the housing is structured to not carry the motor assembly and be employed at the bottom portion of the shaft assembly 110, for example with the lower shaft-and-pinion assembly.)

Figure 6:
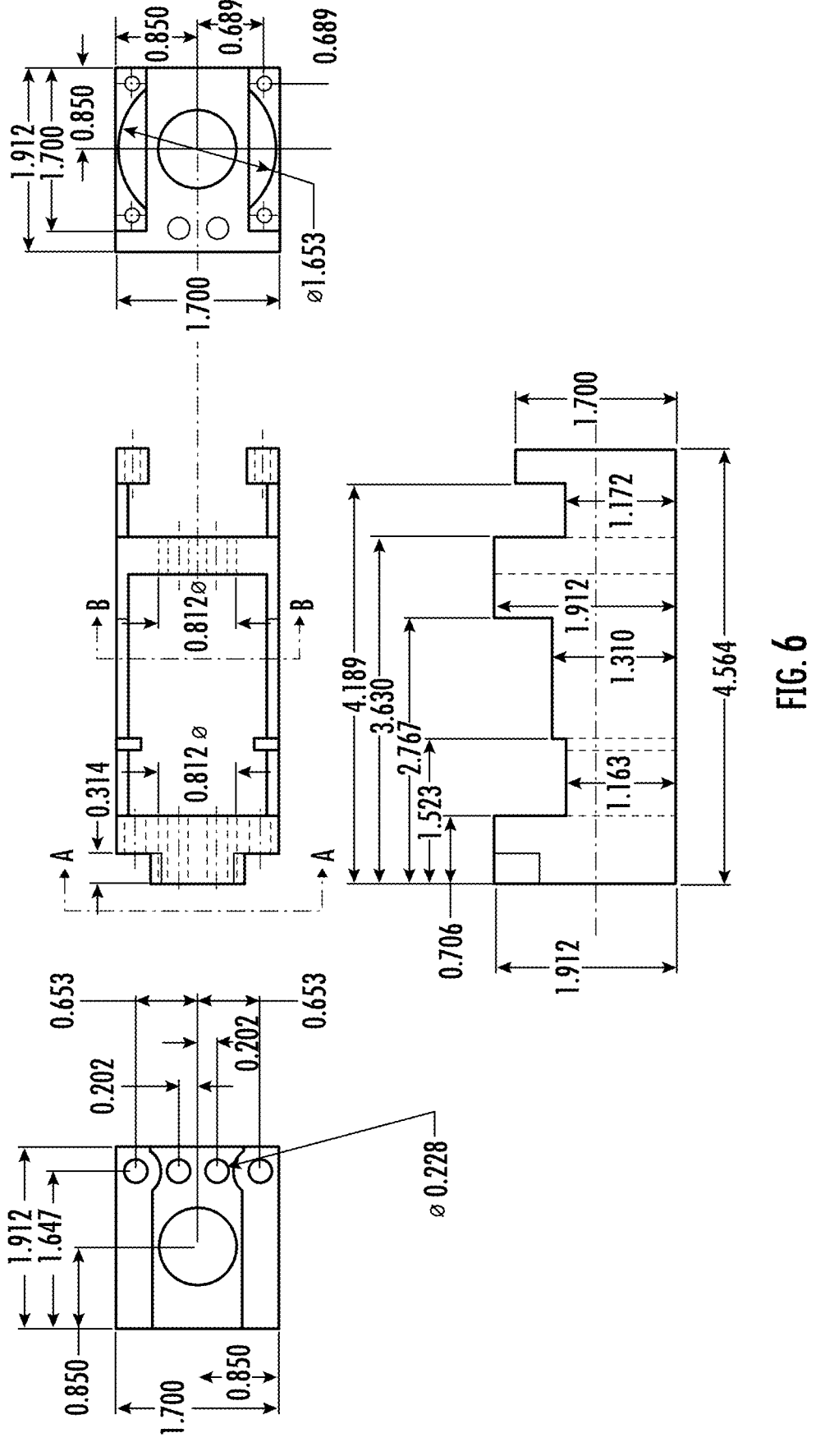
FIG. 6 contains several illustrations providing additional information and identifying a non-limiting set of dimensions of the embodiment of FIGS. 3A, 3B.

As shown in the schematic of FIG. 6, illustrating but one possible set of dimensions for an embodiment of a single-piece monolithic shaft-and-pinion housing: when the first and second wing portions 314, 316 are present, the embodiment may be dimensioned to satisfy at least one of the following conditions: (i) a corresponding height of each of the wing portions 314, 316 does not exceed a height of the second wall 306, and (ii) at least one of the wing portions 314, 316 has a first wing height and a second wing height greater than the first wing height (and a section of the such wing portion having the second wing height is separated from the back wall 306 by another section of such wing portion having the first wing height). Optionally, a height of the front wall 304 and a height of the back wall 306 may be substantially equal, while a height of at least one of the side walls 308, 310 may be chosen to not exceed either of the height of the wall 304 and the height of the wall 306.

Referring again to FIGS. 3A, 3B, 4A, 4B, 5, and 6, the front wall 304 additionally carries an outer ridge 318 that protrudes outwardly and that is separated from the hollow 302A by the wall 304. (In a related embodiment, the back wall 306 may include a similarly structured and oriented outer ridge of its own; see, for example, FIGS. 9A, 9B below.) Generally, in each implementation of the monolithic shaft-and-pinion housing where at least one outer ridge such as ridge 318 is present, such ridge has a substantially rectangular cross-section in a cross-sectional plane that is parallel to a wall from which said ridge protrudes (in the example of FIGS. 3A, 3B—wall 304).

Each of the front and back walls 304, 306 contains a respectively corresponding throughout opening (here—320, 322) that are substantially co-axial with one another and with an opening axis 324 that is transverse to the axis of the hollow 302B. The openings 320, 322 are dimensioned to accommodate the shaft (not shown) and, when a respective outer ridge is present—extends through such outer ridge. (In the example of FIGS. 3A, 3B, the throughout opening 320 is formed through both the front wall 304 and the corresponding outer ridge 318, while the opening 322 is formed throughout the back wall 306 only—since the wall 306 does not carry a corresponding outer ridge.) At least one of these throughout openings may be threaded (as shown here—the opening 320) to accommodate the fixtures securing a combination of the shaft and pinion within the monolithic shaft-and-pinion housing 300.

In at least one specific case, the embodiment of the shaft-and-pinion housing additionally includes comprising a pair of wall bores 326 formed through the front wall 304 in immediately neighboring each other corners of such wall and/or a pair of wall bores 328 formed through the back wall 306 in immediately neighboring each other corners of such wall. Optionally, corresponding diameters of each wall bore 326 is smaller than a diameter of the throughout opening 320 and a corresponding diameter of each wall bore 328 is smaller than a diameter of the second throughout opening 322.

Figure 7A:
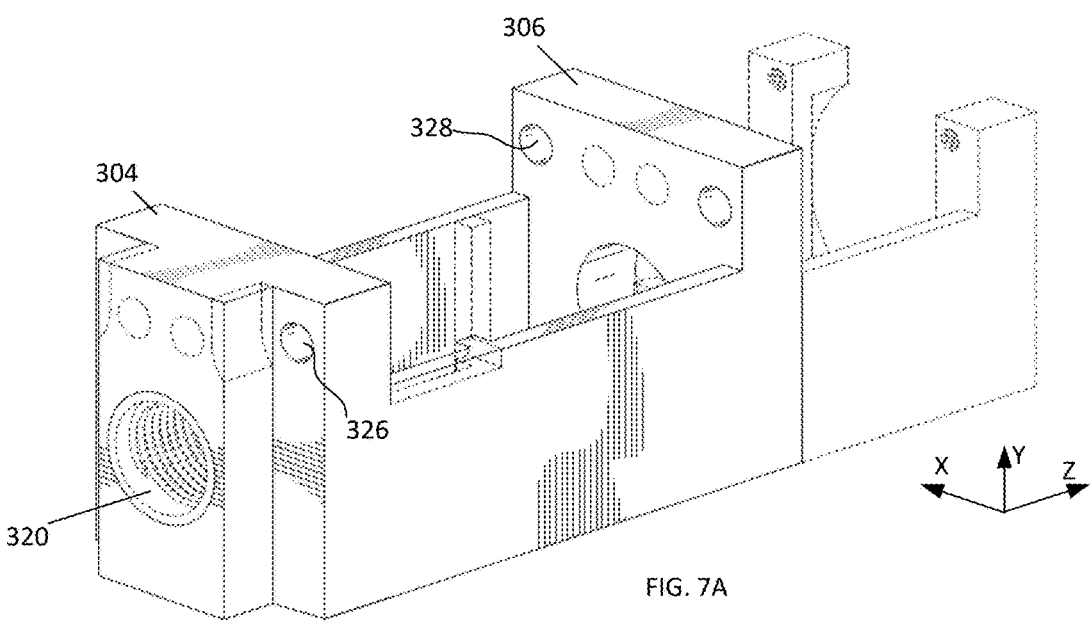
FIGS. 7A, 7B provide two additional perspective views of the embodiment of FIGS. 3A, 3B in which optional structural features of the embodiment are indicated with dashed lines.
Figure 7B:
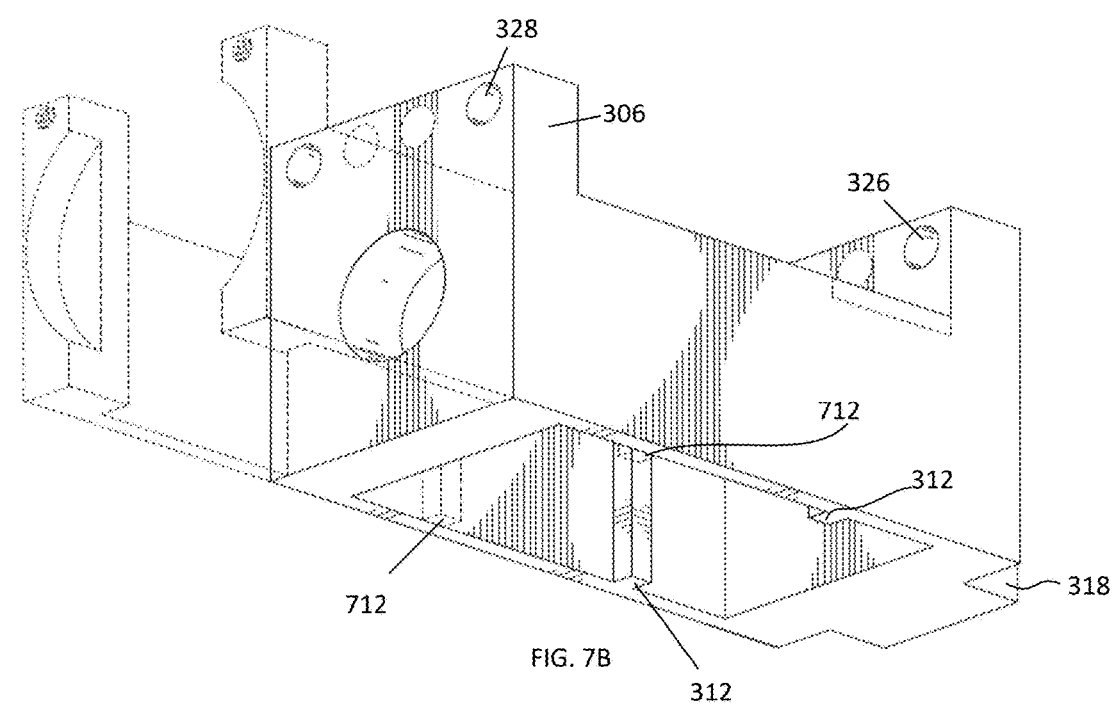

FIGS. 7A, 7B illustrate schematically an embodiment 700 that is similar to the embodiment 300, in which the optional structural elements are shown in dashed lines. Here, the auxiliary pair of the inner wall ribs 712 is outlined.

Figure 8:
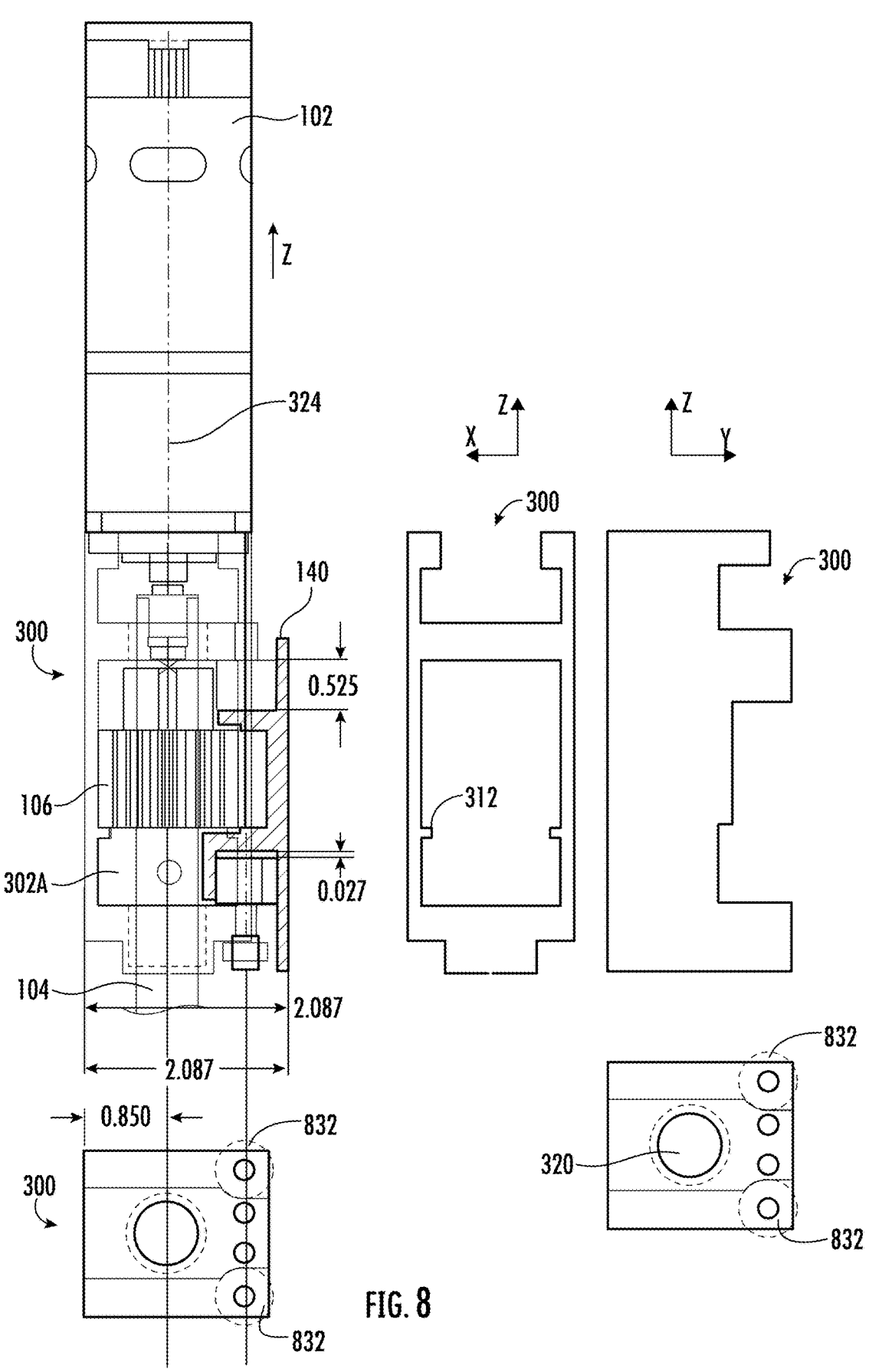
FIG. 8 presents multiple views of a shaft assembly employing the embodiment of FIGS. 3A, 3B as well as several views of the constituent components of such assembly, thereby illustrating cooperation of the embodiment of the shaft-and-pinion housing with the shaft and pinion of the assembly.

FIG. 8 presents a schematic illustration of a portion of the shaft assembly 110 in which the motor assembly 102 is structurally cooperated with the embodiment 300 of the single-piece monolithic shaft-and-pinion housing (with the retaining element 832 fitted into a corresponding channel 148 of the rack assembly 140), as well as several additional views of the constituent components of the shaft assembly 110. As seen in FIG. 8, the embodiment 300 is dimensioned to at least partially enclose the shaft 104 and the pinion 106 on the shaft within the substantially rectangular hollow 302A and is configured to rotatably support such shaft and the pinion on the shaft within the substantially rectangular hollow 302A.

As shown in FIG. 8, the shaft 104 is inserted into the substantially coaxial with one another through-holes 320, 324 of the front and back walls of the embodiment 300 to traverse the HSS of the embodiment 300 substantially parallel to an axis 324 of these through-holes (which axis is substantially parallel to the Z-axis of the local coordinate system. The pinion 106 is (optionally removably) affixed to and secured on the shaft 104 within bounds of the substantially rectangular hollow 302A of the embodiment 300 to have longitudinal movement of the shaft 104 and/or pinion 106 along the axis 324 of the through-holes limited by the pair of inner wall ribs 312. Alternatively or in addition, the assembly includes at least one retaining element 832 (in this specific example, shown as including two rollers rotatably secured on corresponding axles affixed in one of a pair of bores 326 formed through the front wall 304 in immediately neighboring each other corners of such wall). It is appreciated that—in addition or alternatively to the use of rollers, the retaining element(s) 832 may contain and/or be limited to other material pieces or structures, optionally formed to be monolithic with the embodiment of the housing, that are configured to fit dimensionally into a receiving portion of a rack assembly of the sliding support mechanism to limit repositioning of the housing along the opening axis and along a first axis transverse to the opening axis. Alternatively or in addition—and when the first and second wing portions 314, 316, as is the case in FIG. 8—the shaft assembly includes a motor assembly 102 having a motor and a motor shaft (not labelled for the simplicity of illustration), the motor being removably secured to free ends of the wings 314, 316 opposite to the back wall 306 wall such as to have the motor shaft aligned substantially co-axially with the axis 324 of the through-holes 320, 324.

The skilled artisan will readily appreciate from FIG. 8 that at least one embodiment of the invention includes a rack assembly of the sliding support mechanism with the rack, and at least one of the following conditions is satisfied: (i) the rack assembly has a first upper sliding surface and a first lower sliding surface, the first lower sliding surface defining a channel, and (ii) the first and second retaining elements include a first wear surface configured to laterally slide upon the first upper sliding surface and a second wear surface configured to slide within the channel. Preferably, the separation between the first and second wear surfaces of the retaining elements along the opening axis 324 and a second separation between the opening axis and the rack of the assembly 140 to limit a displacement of a combination of the housing 300 containing the pinion 106 to maintain operable engagement between the pinion and the rack both along the opening axis and along the axis transverse to the opening axis.

Figures 9A, 9B:
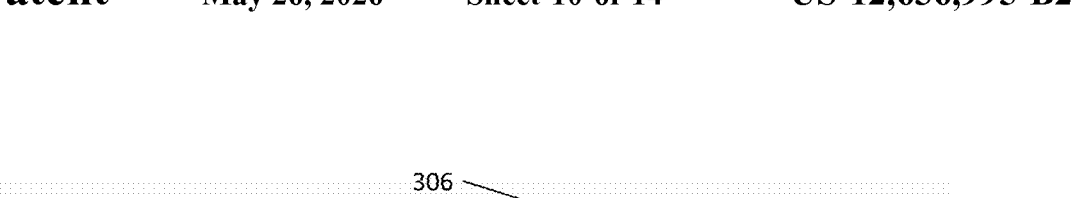
FIGS. 9A, 9B show a related embodiment of the single-piece monolithic shaft-and-pinion housing.

FIGS. 9A, 9B show a related embodiment of the single-piece monolithic shaft-and-pinion housing 900, which is devoid of the wing portions of the embodiment 300 and which includes an outer ridge 916 protruding away from the rectangular hollow 302A from the back wall 306. An optional auxiliary pair of the inner wall ribs or steps 912 can be formed in corresponding corners between the side walls of the HSS 308, 310 and the back wall 306. (Notably, referring again to FIGS. 9A and 3A and 7A, the skilled person will readily appreciate that the presence of the outer ridges 318, 916 is optional, and that more generally the walls 304, 306 may be dimensioned as substantially equi-thick plates: the outer ridges may be incorporated if desired to save some material during the extrusion-base process of fabrication of the embodiments.)

Figure 10C:
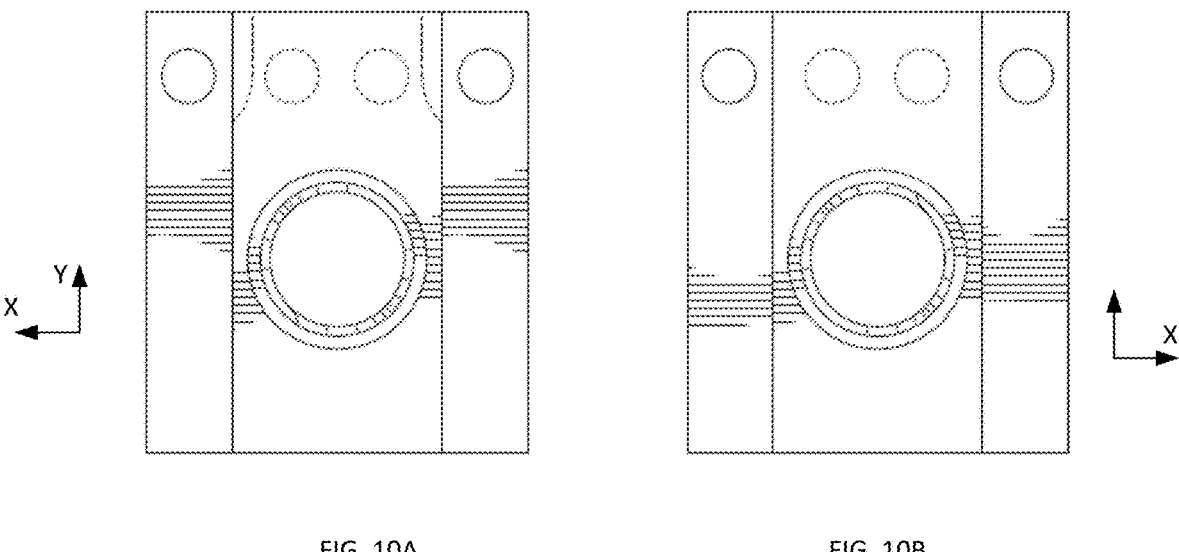
Figure 10C:
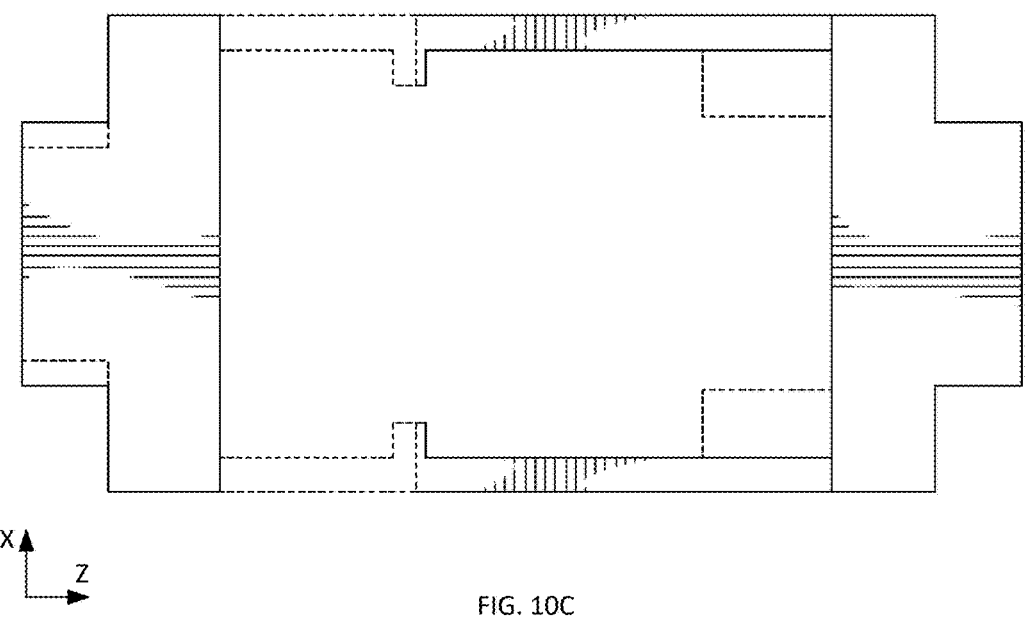

FIGS. 10A, 10B, and 10C present the embodiment of FIGS. 9A, 9B in a font view, a back view, and a top view, respectively.

Figure 11:
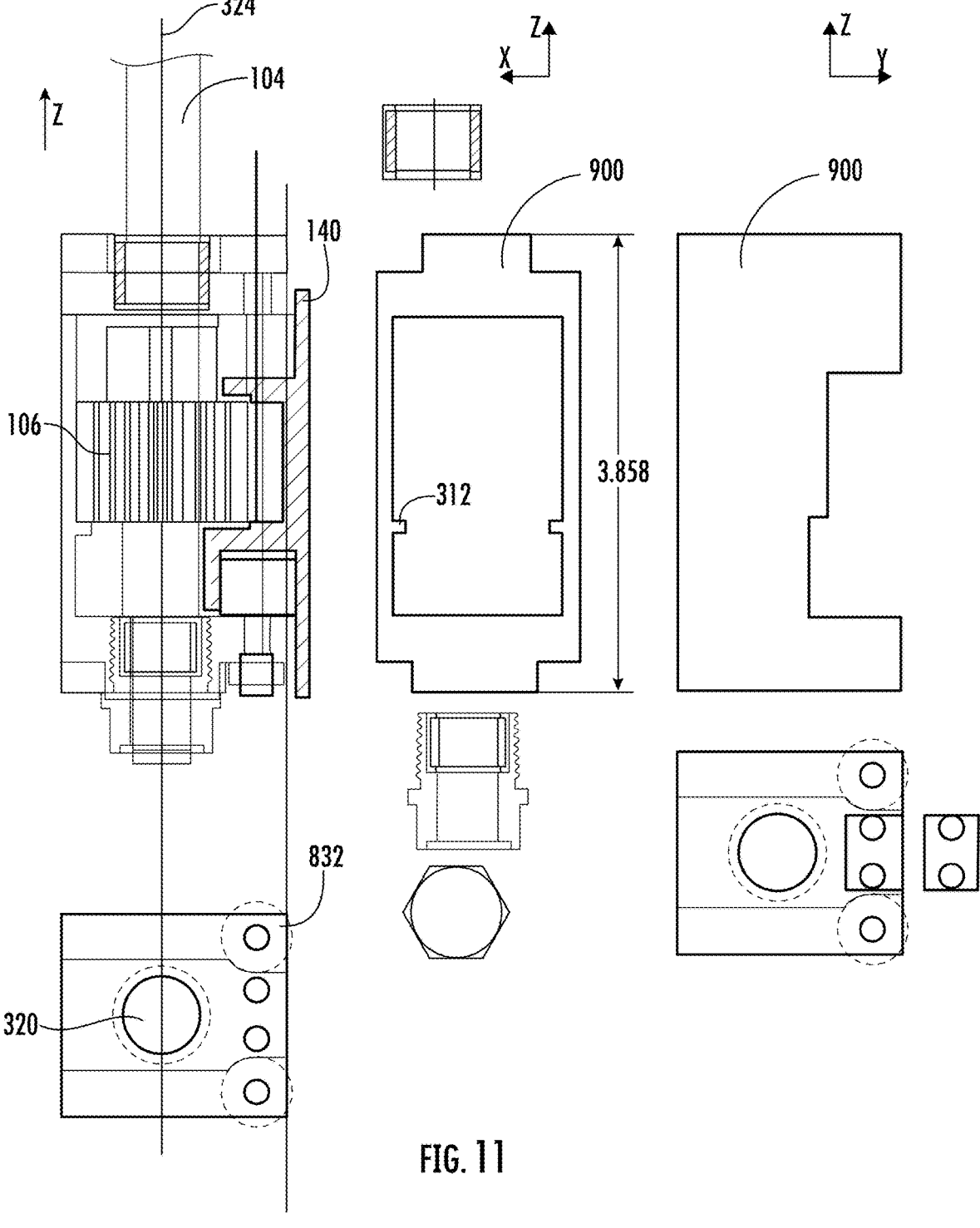
FIG. 11 presents multiple views of a shaft assembly employing the embodiment of FIGS. 9A, 9B as well as several views of the constituent components of such assembly, thereby illustrating cooperation of the embodiment of the shaft-and-pinion housing with the shaft and pinion of the assembly.

By analogy with FIG. 8, FIG. 11 presents a schematic illustration of a portion of the shaft assembly 110 in which the shaft 104 with the pinion 106 are cooperated with and within the embodiment 900 of the single-piece monolithic shaft-and-pinion housing (with the retaining elements 832 fitted into a corresponding channel of the rack assembly 140), as well as several additional views of the constituent components of the shaft assembly 110. As seen in FIG. 11, the embodiment 900 is dimensioned to at least partially enclose the shaft 104 and the pinion 106 on the shaft within the substantially rectangular hollow of the embodiment 900 and is configured to rotatably support such shaft and the pinion on the shaft within such substantially rectangular hollow.

The skilled artisan will readily appreciate from FIG. 11 that at least one embodiment of the invention includes a rack assembly of the sliding support mechanism with the rack, and at least one of the following conditions is satisfied: (i) the rack assembly has a first upper sliding surface and a first lower sliding surface, the first lower sliding surface defining a channel, and (ii) the first and second retaining elements include a first wear surface configured to laterally slide upon the first upper sliding surface and a second wear surface configured to slide within the channel. Preferably, the separation between the first and second wear surfaces of the retaining elements along the opening axis 324 and a second separation between the opening axis and the rack of the assembly 140 to limit a displacement of a combination of the housing 000 containing the pinion 106 to maintain operable engagement between the pinion and the rack both along the opening axis and along the axis transverse to the opening axis.

FIG. 13 schematically addresses another—related but alternative—structural approach to formatting the single-piece monolithic shaft-and-pinion housing. FIG. 13 includes two groups of illustration—group (A) that schematically depicts an alternative embodiment of the single-piece monolithic shaft-and-pinion housing 1310 shat is structured as a component in which a space between the first and second portions 1310A, 1310B of the hard exterior (containing, respectively, corresponding throughout openings co-axial with the axis 1314—not shown for simplicity of illustration) is not limited along an axis that is transverse to the axis 1314 and that, in the local system of coordinates, substantially coincides with the X-axis). The inner rib or step of the embodiment 1310 is indicated as 1318. The other illustration of the group (A) of FIG. 13 schematically shows the operable cooperation of the monolithic housing 1310 that is complemented with the retaining elements 832 (shown in this specific example as rollers, but with understanding that at least a portion of such retaining elements may be alternatively or in addition be formatted to be monolithic with the housing 1310) and that exhibit corresponding wear surfaces. The embodiment of the housing is operably cooperated with the rack assembly of the sliding mechanism. As the skilled person will readily appreciate from the group (A) of illustrations of FIG. 13, an embodiment of the invention includes a rack assembly of the sliding support mechanism with the rack, and at least one of the following conditions is satisfied: (i) the rack assembly has a first upper sliding surface and a first lower sliding surface, the first lower sliding surface defining a channel, and (ii) the first and second retaining elements include a first wear surface configured to laterally slide upon the first upper sliding surface and a second wear surface configured to slide within the channel. Preferably, the embodiment 1310 of the housing is dimensioned to have a first separation between the first and second wear surfaces of the retaining elements along the opening axis and a second separation between the opening axis and the rack to limit a displacement of a combination of the housing and the pinion to maintain operable engagement between the pinion and the rack both along the opening axis and along the first axis.

Implementations of the idea of the invention may additionally address yet another persisting operational problem of the sliding mechanism. As discussed above, the slide-out module is extended and retracted, along the sliding support mechanism, with the use of at least one motor (which is part of a motor assembly of the sliding support mechanism) that actuates the pinion (typically secured on the rotatable shaft of the motor assembly) meshed with the rack attached to a wall of the slide-out module. In light of the fact that rarely a side surface of an RV slide-out module is planar, the utilization of the conventionally structured sliding support mechanism (in which the rotational motion of the motor is translated to the linear motion of the slide-out motion along the rack with the use of a single-piece shaft, dimensioned typically as a rod) causes problems not only with installation of the sliding support mechanism but with operations of such mechanism as well.

Embodiments of the invention solve this problem by devising a sliding support mechanism (for use with an RV slide-out module) utilizing a multi-piece-shaft in which constituent pieces, connected to one another length-wise, are substantially moveable with respect to one another such as to allow for accommodation of the non-planarity of the wall of the slide-out module when extended along such wall.

To this end, FIG. 12 illustrates accommodation of a specific non-limiting version of the implementation of the idea of the invention to the case where the sliding mechanism, configured to support the slide-out module, is dimensioned to accommodate the structural deficiencies of the slide-out module. Here, as shown, the sliding mechanism is attached to the slide-out module wall exhibiting multiple (as shown—two) angular deviations from the plane—in the upper portion of the wall (by an angle A1) and in the lower portion of the wall (by an angle A2). To accommodate and obviate these imperfections of the wall of the slide-out module, the shaft 1204 may include a first (upper) portion of the shaft 1204-1 carrying the pinion 106 of the upper shaft-and-pinion assembly 1220 housed in the corresponding single-piece monolithic shaft-and-pinion housing structure 300 and at least one other, a (lower) portion 1204-2 of the shaft carrying the pinion of the lower housed in the corresponding shaft-and pinion housing 118, and a third (here shown as the middle) portion 304-3 of the shaft connecting the upper and lower portions 1204-1, 1204-3 of the shaft with one another. In one specific case, one of the cooperated with one another portions of the multi-piece shaft 1204 may be equipped with a specifically-structured aperture dimensioned to be preferably oversized to accept therein an end of the other portion and an additional fastening element configured to secure such end in the aperture one the end has been inserted into the aperture. In the example of FIG. 12, such aperture is shown as aperture 1210 formed at the end of the shaft portion 1204-2 and dimensioned to ensure such type of a clearance fit between the end of the portion 1204-3 of the multi-piece shaft 1204 and the aperture 1210 that enables the mutual tilt of the portions 1204-2 and 1204-3 when such portions are connected with one another. (For example, the dimensions of the end of the portion 1204-3 and the aperture 1210 at the corresponding end of the portion 1204-2 may be chosen to ensure an easy slide fit, a running fit, a loose running fit, or a free running fit, as understood in related art; see, for example, learnmech-.com/engineering-fits-clearance-transition-interference-fit).

The joint 1214 formed by the corresponding ends of the portions 1204-2, 1204-3 may be structured to include—in one specific non-limiting case illustrated in FIG. 12—a removable pin 1218 affixed across the aperture 1210 and passing through the opening in the end of the portion 1204-3. (The joint 1224 formed by the corresponding ends of the shaft portions 1204-1, 1204-3 can be structured substantially similarly, at least in one implementation.) When present, the pin 1218 is preferably fit to the portion 1204-3 but is oversize to the aperture 1210 so that drive torque from the motor assembly 102 can be easily transmitted to the portion 1204-2 of the shaft 1204 through the portions 1204-1, 1204-3. In one specific implementation of the multi-piece shaft, the middle portion 1204-3 of the multi-piece shaft may be dimensioned to have a polygonal (in a non-limiting example—hexagonal) cross-section while the apertures 1210 at the ends of the shaft portions 1204-1, 1204-2 may have correspondingly-dimensioned (polygonal) cross sections. Understandably, the shaft portions 1204-1, 1204-2, 1204-3 of the multi-piece shaft of the embodiment of the invention should be appropriately dimensioned to enable the tilt between the axes of the portions 1204-1, 1204-3 of at least A1 degrees and the tilt between the axes of the portions 1204-2, 1204-3 of at least A2 degrees, to compensate for and accommodate the un-evenness of the surface of the slide-out wall and to ensure reliable rotation of the multi-piece shaft about the axis of the output rotor of the motor assembly 102 during the operation of the sliding support mechanism.

The cooperation between the shaft portion 1204-1 and the output rotor of the motor assembly 102 can be structured with the use of a substantially flat surface at the output rotor, a specifically structured bearing that is configured to receive the shaft portion 1204-1 and encircle it at a point the output rotor and an end of the portion 1204-1, or with the use of a structure employing splines-such as that discussed in reference to, for example, FIGS. 7A, 7B, 7C of the U.S. Pat. No. 11,137,054.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself. The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

For the purposes of this disclosure and the appended claims, the expression of the type "element A and/or element B" is defined to have the meaning that is equivalent to "at least one of element A and element B".

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention. Within this specification, embodiments have been described in a way that enables a clear and concise specification to be written, but it is intended and will be appreciated that embodiments may be variously combined or separated without parting from the scope of the invention. In particular, it will be appreciated that all features described herein are applicable to substantially all aspects of the invention.

In addition, when the present disclosure describes features of the invention with reference to corresponding drawings (in which like numbers represent the same or similar elements, wherever possible), the depicted structural elements are generally not to scale, and certain components are may be enlarged relative to the other components for purposes of emphasis and understanding. It is to be understood that no single drawing is intended to support a complete description of all features of the invention. In other words, a given drawing is generally descriptive of only some, and generally not all, features of the invention. A given drawing and an associated portion of the disclosure containing a description referencing such drawing may not, generally, contain all elements of a particular view or all features that can be presented is this view, at least for purposes of simplifying the given drawing and discussion, and directing the discussion to elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described single features, structures, or characteristics of the invention may be combined in any suitable manner in one or more further embodiments.

While the invention is described through the above-described specific non-limiting embodiments, it will be understood by those of ordinary skill in the art that modifications to, and variations of, the illustrated embodiments may be made without departing from the inventive concepts disclosed herein. The disclosed aspects may be combined in ways not listed above. For example, substantially every implementation of the idea of the present invention can be combined and is intended to be combined with any embodiment of the structures discussed in the U.S. Pat. No. 11,137, 054 (and whether or not explicitly presented in the discussion above). Accordingly, the scope of the present invention includes such combination(s) and the invention should not be viewed as being limited to the disclosed embodiment(s).

What is claimed is:

1. An article of manufacture comprising:

a shaft-and-pinion housing of a sliding support mechanism containing a shaft with a pinion secured on the shaft, said housing configured as a single-piece monolithic profile of a chosen material that includes:

a) a hard exterior of the housing having a first opening therethrough and a second opening therethrough, the first and second opening being co-axial with one another and dimensioned to accommodate the shaft therethrough and having an opening axis, wherein a separation distance between a first portion of the hard exterior carrying the first opening and a second portion of the hard exterior carrying the second opening is dimensioned to reversibly receive the pinion in a space between the first and second openings;

b) a hollow structural section (HSS), of said monolithic profile, that includes a hollow with a polygonal perimeter that has an axis of the hollow and is limited by a first wall, a second wall opposite to the first wall, a third wall and a fourth wall opposite to the third wall, wherein the first wall, the second wall, the third wall, and the fourth wall are parts of the hard exterior, wherein the axis of the hollow is parallel to a first axis that is transverse to the opening axis; and c) a pair of inner wall ribs extending along the first axis on inner surfaces of the third and fourth walls, respectively, and protruding towards each other from respective walls along a second axis that is transverse to both the first axis and the opening axis, and a first retaining element protruding from the first portion of the hard exterior and a second retaining element protruding from the second portion of the hard exterior, wherein at least one of said first and second retaining elements is configured to fit dimensionally into a receiving portion of a rack assembly of the sliding support mechanism such as to limit repositioning of the housing along the opening axis and along the first axis, wherein a space between the first portion of the hard exterior and a second portion of the hard exterior is not limited along a second axis that is transverse to both the first axis and the opening axis.

2. An article of manufacture according to claim 1, wherein:

at least one of the first and second retaining elements is monolithic with the housing, or the at least one of the first and second retaining elements includes a roller configured to be removably attachable to the housing and/or a piece of material configured to be attachable to the housing.

3. An article according to claim 1, wherein an auxiliary inner wall rib of a pair of auxiliary inner wall ribs is formed in a corner defined by meeting of the second wall with either the third wall or the fourth wall.

4. An article of manufacture according to claim 1, further comprising first and second wing portions outwardly extending, respectively, from the second wall portion along the third and fourth wall portions, and/or at least one outer ridge protruding outwardly from a corresponding wall of at least one of the first and second walls.

5. An article according to claim 4, wherein:

a corresponding height of each of said wing portions does not exceed a height of the second wall; and/or at least one of said wing portions has a first wing height and a second wing height greater than the first wing height, wherein a section of the at least one of said wing portions having the second wing height is separated from the second wall by a section of the at least one of said wing portions having the first wing height.

6. An article according to claim 4, further comprising a motor having a motor shaft, the motor being removably secured to free ends of the first and second wings opposite to the second wall such as to have the motor shaft be aligned substantially co-axially with the second axis.

7. An article of manufacture according to claim 1, wherein one of the following conditions is satisfied:

(a) at least one of the third and fourth walls has first and second different from one another wall heights;

(b) a portion of the at least one of the third and fourth walls that has the first wall height is separated from the first wall by another portions of the at least one of the third and fourth wall that has the second wall height, the second wall height being smaller than the first wall height;

(c) the housing includes at least one outer ridge protruding outwardly from a corresponding wall of at least one of the first and second walls.

8. An article of manufacture according to claim 1, wherein the article further comprises the shaft removably inserted through the first and second openings to traverse said space substantially parallel to the opening axis, and the pinion removably put on and secured on the shaft between the first and second portions of the hard exterior such as to have longitudinal movement of the shaft and/or pinion along said opening axis limited by at least one inner wall rib formed on an inner surface of the housing.

9. An article according to claim 1, wherein at least one of the first and second openings is internally threaded.

10. An article of manufacture according to claim 1, further comprising:

the shaft inserted through the first and second openings to traverse the housing substantially parallel to the opening axis, and the pinion removably put on and secured on the shaft between the first and second portions of the hard exterior such as to have longitudinal movement of the shaft and/or pinion along said opening axis limited by at least one inner wall rib or step formed on an inner surface of the housing.

11. An article of manufacture according to claim 10, further comprising the rack assembly of the sliding support mechanism including a rack, wherein the first and second retaining elements comprise a first wear surface configured to laterally slide upon a sliding surface of the rack assembly and a second wear surface configured to slide within a channel of the rack assembly.

12. An article of manufacture according to claim 11, wherein the housing is dimensioned to have a first separation between the first and second wear surfaces along the opening axis and a second separation between the opening axis and the rack to limit a displacement of a combination of the housing and the pinion to maintain operable engagement between the pinion and the rack both along the opening axis and along the first axis.

13. An article of manufacture according to claim 10, wherein at least one of the first and second retaining elements includes at least two rollers dimensioned to run within a first channel defined by a lower sliding surface of the rack assembly and/or a material piece that is dimensioned to run within the first channel and that is monolithic with the shaft-and-pinion housing.

14. An article of manufacture according to claim 10, further comprising the rack assembly of the sliding support mechanism including a rack, wherein the rack assembly has a first upper sliding surface and a first lower sliding surface, the first lower sliding surface defining a first channel having a height of the first channel and a width of the first channel.

15. An article of manufacture according to claim 1, further comprising the shaft that includes multiple shaft portions inserted into at least one of the first and second openings, wherein at least one of the following conditions is satisfied:

the multiple shaft portions are moveable with respect to one another; and the shaft includes at least one joint and first and second shaft portions, of the multiple shaft portions, that are moveably connected to one another at the at least one joint, and further includes a third shaft portion of the multiple shaft portions, the third shaft portion separated from the first shaft portion by the second shaft portion, an axis of the first shaft portion and/or an axis of the third shaft portion being tilted with respect to an axis of the second shaft portion.

16. An article of manufacture according to claim 1, further comprising a motor removably secured to the shaft.

* * * * *